United States Patent [19]

Urban

[11] Patent Number: 5,151,574

[45] Date of Patent: Sep. 29, 1992

[54] ELECTRIC SOLDERING IRON WITH PLUG-IN TIP TEMPERATURE SENSOR

[75] Inventor: Paul L. Urban, Cheraw, S.C.

[73] Assignee: Cooper Industries, Inc., Houston, Tex.

[21] Appl. No.: 423,353

[22] Filed: Oct. 18, 1989

[51] Int. Cl.⁵ .......................... H05B 1/02; B23K 3/04; H01C 7/00; G01K 7/00

[52] U.S. Cl. .................... 219/241; 219/516; 337/381; 338/22 R; 338/28; 374/185

[58] Field of Search ............ 219/241, 516; 338/22 R, 338/25, 28; 374/183–185, 179; 337/381

[56] References Cited

U.S. PATENT DOCUMENTS

| | | | |
|---|---|---|---|
| 2,484,585 | 10/1949 | Quinn | 338/25 |
| 2,582,481 | 1/1952 | Dvorak et al. | 219/241 |
| 2,980,875 | 4/1961 | Sivacek | 338/25 |
| 2,982,838 | 5/1961 | Tyler | 219/241 |
| 3,287,541 | 11/1966 | Weller et al. | 219/241 |
| 3,646,577 | 2/1972 | Ernst | 219/241 |
| 3,800,122 | 3/1974 | Farmer | 219/241 |
| 4,155,063 | 5/1979 | Bowman | 338/28 |
| 4,626,643 | 12/1986 | Minet | 219/516 X |
| 4,924,067 | 5/1990 | Wilhemson | 219/241 |

FOREIGN PATENT DOCUMENTS

| | | | |
|---|---|---|---|
| 2921062 | 12/1980 | Fed. Rep. of Germany | 219/241 |
| 55-112165 | 8/1980 | Japan | 219/241 |
| 1309254 | 3/1973 | United Kingdom | 219/241 |

Primary Examiner—Anthony Bartis
Attorney, Agent, or Firm—Kenyon & Kenyon

[57] ABSTRACT

An electric soldering iron has a barrel connected to a handle a one end and provided with an electric heating element for heating a tip at its other end. A detachable temperature sensor unit is located within the barrel and includes a tubular housing having a temperature sensor projecting from one end and positioned within a hollow bore in the tip to monitor the temperature thereof and electrical contacts on its other end readily detachably connected to electrical contacts of a heating control unit located within the handle. Either the temperature sensor or the housing is spring biased to urge the temperature sensor into close proximity with the tip.

7 Claims, 2 Drawing Sheets

ELECTRIC SOLDERING IRON WITH PLUG-IN TIP TEMPERATURE SENSOR

FIELD OF THE INVENTION

The present invention relates to electronically controlled soldering and desoldering tools and more particularly, to sensor mechanisms for monitoring and controlling the temperature of the heated tip of such devices.

BACKGROUND OF THE INVENTION

Most soldering and desoldering tools (also referred to as devices) currently on the market incorporate some means for monitoring, controlling or regulating the temperature of the soldering or desoldering tip of the device. Ultimately each type of device coordinates the temperature of the heated tool tip with means for regulating the current provided to the tool heating element. Such devices can often take one of two forms.

The first employs a "temperature sensitive" thermal or thermomagnetic switch which turns current to the heating element on and off. In such devices, changes in the temperature of the heated tool tip are translated into mechanical actuation of a switch which controls power provided to the heating element.

The second type of device incorporates a temperature sensor which monitors the temperature of the heated tool tip. The sensors take many forms, such as resistance temperature detectors, thermistors and thermocouples. Sensors often are located in close proximity to the heated tip in order to closely monitor tip temperature. In certain embodiments, the sensor is positioned within a hollow bore inside the tip and is electrically connected to control elements located in the body or handle of the device, which regulate the heating elements of the device, to alter temperature at the operating tip.

Devices employing a temperature sensor have, for most applications, generally proven superior to devices relying on simple switches. However, even the more sophisticated sensor devices have also exhibited certain disadvantages. For example, the temperature sensors can wear out or become damaged during prolonged use. Replacement of the sensors is in many instances relatively difficult and costly. Sensors currently employed are usually "hard-wired" to other components in the device and thus require that the device be disassembled for replacement. Replacement may also require replacement of leads or resoldering of connections resulting in significant downtime as a result of the tool being out of commission, especially when these operations are performed by electrically unskilled operators. Also, the sensors are often integrated with other components within the device such that replacement of the sensor requires concomitant replacement of other components which still have useful life. It would, therefore, be desirable to provide a device which provides the advantage of a temperature sensor while providing for easier and more economic sensor replacement and operation.

SUMMARY OF THE INVENTION

The apparatus of the invention overcomes the disadvantages noted above with a unique combination of elements. As described with respect to the preferred embodiment, this apparatus includes a body, a detachable sensor unit and an operating element. The body comprises a handle, a power supply, a mechanism for monitoring and/or controlling the temperature of the heating element in relation to temperature measurements taken by the sensor unit, and contacts mounted within the body for connecting the sensor unit to the monitoring means.

The detachable sensor unit comprises a unit housing, a temperature sensor mounted within the housing and adapted for placement in proximity to the tip to monitor the temperature of the tip, and contacts on the housing for connecting the temperature sensor to the monitoring means. The operating element comprises a barrel extending from the body, a tip located at the end of the barrel, and a heating element mounted on or within the barrel and adapted for conducting heat to the tip.

In certain embodiments, the sensor unit further comprises a spring mounted within the housing for urging the temperature sensor into engagement or proximity with the tip. Alternatively, a spring is mounted within the handle to push the sensor unit into engagement or proximity toward the tip.

DETAILED DESCRIPTION OF THE INVENTION

Soldering and desoldering tools of the present invention include a detachable sensor unit 10, a body portion 11 and a heated operating element 12.

Figure 1:
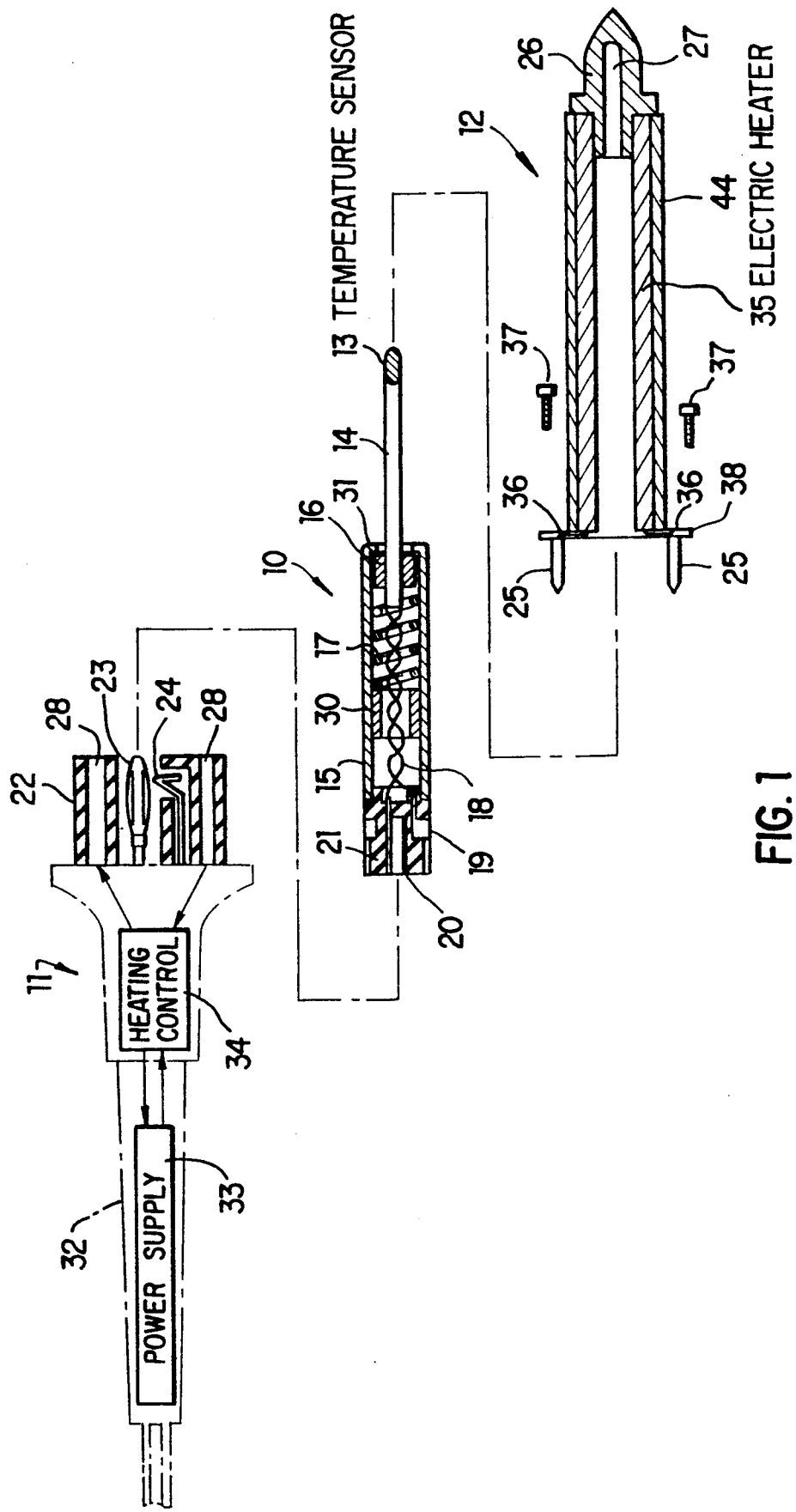
FIG. 1 is a sectional view along the longitudinal axis of a soldering/desoldering tool of the present invention incorporating a detachable sensor unit.
Figure 2:
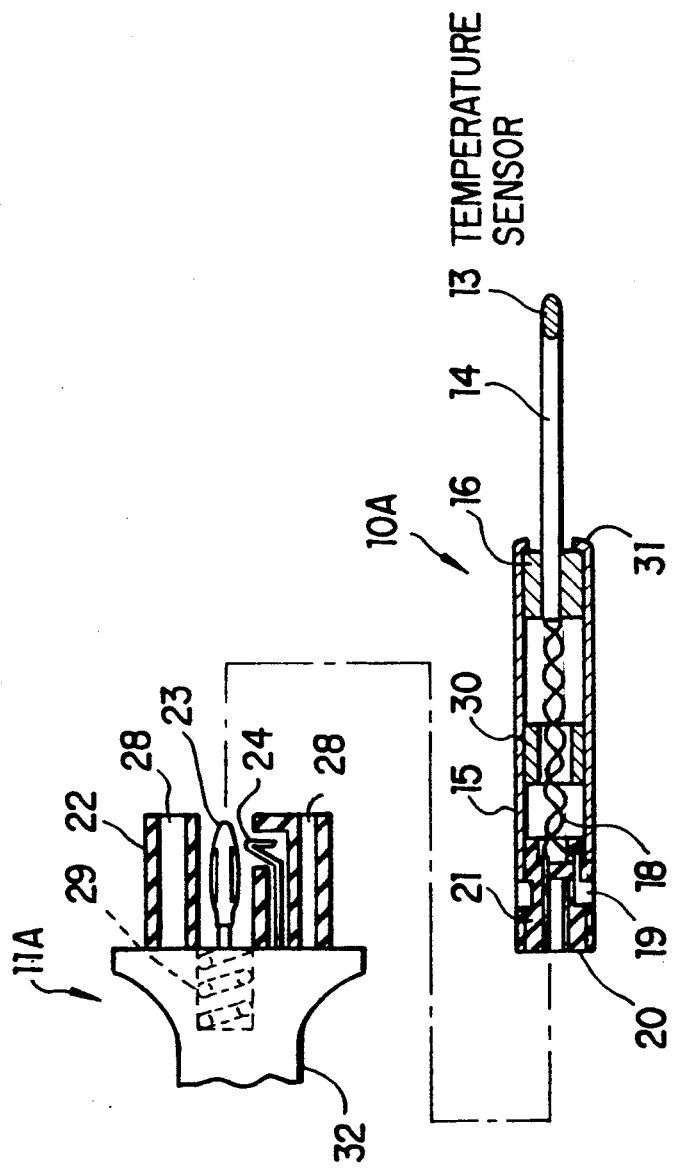
FIG. 2 is a fragmentary sectional view along the longitudinal axis of an alternative embodiment of a soldering/desoldering tool of the present invention.

Two embodiments of a detachable sensor unit 10 are shown in FIGS. 1 and 2. Sensor 13 can be any type of temperature sensing device, such as an encapsulated resistance temperature detector, thermistor or thermocouple, which can be fashioned to fit within the space available within the tool. Where a thermocouple is used as the sensor, thermocouple compensation in accordance with known practices may be required to accommodate heat generated by the operating device and voltage changes at various interfaces which may affect readings from the thermocouple.

Sensor 13 is located at the end of sensor member 14. In various embodiments sensor 13 may be mounted within member 14 by various known methods, including impregnation of the sensor in thermal conductive material, which fills part of the sensor member. Sensor member 14 is mounted within a generally cylindrical or rectangular housing 15 by bushing 16, which surrounds one end of sensor member 14 to permit a sliding fit with the inner surface of housing 15.

In the embodiment shown in FIG. 1, spring 17 is mounted within housing 15 between support 30 and bushing 16. Spring 17 contacts and biases bushing 16 toward one end of housing 15. In normal position, as shown, spring 17 acting on bushing 16 extends sensor member 14 to the furthest position exterior of housing 15. For this purpose, housing 15 defines a stop member or annular ring 31 that engages an end of bushing 16 remote from spring 17 to limit movement of bushing 16 and ultimately sensor member 14. As explained further below, the effect of spring 17 on bushing 16 urges sensor 13 into engagement or proximity with the soldering tip 26 of the device for proper temperature measurement.

In the embodiment shown in FIG. 2, sensor unit 10A does not contain a spring and bushing 16 is secured to housing 15. Instead, spring 29 is mounted within body 11A and pushes the entire sensor unit 10A toward engagement with or in close proximity to tip 26 of the device such that sensor 13 is urged into proximity with tip 26.

In operation of the devices of the present invention, it is desirable to keep temperature sensor 13 in engagement with or at close proximity to the heated tip 26 such that appropriate temperature measurements can be made. The characteristics of the sensor will determine what spatial relationship between the sensor and the heated tip is necessary to make reliable measurements. Some sensors may require that the tip make direct contact with the sensor. Others may allow (or even prefer) some space between the surfaces of the tip and sensor. In each case, the position or positions of the sensor with respect to the tip which will allow measurements to be taken are in "proximity" to or with the tip as that term is used herein.

Sensor leads 18 connect sensor 13 to conducting sensor unit contacts, outer contact 19 and inner contact 20. Outer contact 19 has a contact surface on the outer surface of housing 15. Preferably, outer contact 19 forms a continuous conducting band around the outer surface of housing 15. Inner contact 20 forms a socket in the end of housing 15 opposite to sensor member 14. Outer contact 19 and inner contact 29 and housing 15 are separated by insulator 21.

Body 11 contains features commonly found in soldering/desoldering tools and known to those skilled in the art including a handle 32, a power supply (schematically represented by box 33) and means (schematically represented by box 34) for monitoring, controlling and/or regulating the temperature of the heated tip 26 in response to temperature measurements taken by sensor 13. Appropriate monitoring, controlling and regulating means are known to skilled artisans. Body 11 also contains receptacle housing 22 which serves to connect body 11, sensor unit 10 and operating element 12. Sockets 28 are adapted for receiving pins 25 which serve through leads 36 (a) to supply power to the heating element 35 in barrel 44, and (b) to ground operating element 12.

Receptacle contacts, i.e., inner pin contact 23 and outer spring contact 24, are arranged to engage inner contact 20 and outer contact 19, respectively, when sensor unit 10 in inserted into receptacle housing 22. Engagement of pin contact 23 with inner contact 20 and of spring contact 24 with outer contact 19 completes a circuit connecting sensor 13 to means 34 for controlling, monitoring and/or regulating the amount of heat delivered by the heating element 35 to tip 26.

Preferably, outer contact 19, inner contact 20, pin contact 23 and spring contact 24 are made from or plated with low resistance materials, such as gold, for best performance. Other suitable materials for providing low resistance conductivity are known in the art.

Operating element 12 comprises barrel 44, heating element 35 and tool tip 26. Suitable materials for forming barrel 44 and tip 26 are well known to those skilled in the art. In a preferred embodiment, the barrel and tip are formed from stainless steel and copper, respectively. Appropriate heating elements and constructions for transferring heat from the heating element to tip 26 are also known to skilled artisans. In a preferred embodiment, the heating element is made from a high resistance material, such as tungsten, nickel-chrome alloys or other suitable materials. Heat is conducted to the tool tip by a combination of convection and radiation.

Barrel 44 is hollowed out to receive the sensor unit 10. Tip 26 also contains a hollow bore 27 for receiving sensor member 14. As sensor member 14 is inserted into bore 27, sensor 13 abuts the closed end of bore 27. In the embodiment shown in FIG. 1, pins 25 engage with sockets 28 and screws 37 through holes in flange 38 on heater 35 and serve to secure heater 35 to handle 11. Assembly of the tool will result in compression of spring 17 such that sensor member 14 is partially pushed back into housing 15 in the direction of receptacle housing 22. At the same time, the compressive forces of spring 17 serve to urge sensor 13 toward the closed end of bore 27 and into proximity with heated tip 26. In the embodiment shown in FIG. 2, spring 29 pushes the entire sensor unit 10 toward tip 26 such that sensor 13 is urged toward the closed end of bore 27 and into proximity with heated tip 26. The action of spring 17 or 29 provides a "sensor float" within the barrel which both properly positions the sensor with respect to the tip and prevents the sensor from being damaged when the tool is assembled. In certain embodiments, barrel 44 is attached to handle 11 or receptacle housing 22 with screws or other attaching means.

Sensor unit 10 is "detachable" in the sense that no permanent connections need be broken to disengage the sensor unit 10 from the body 11 and operating element 12 of the device. The sensor unit can be removed from the device without the use of tools to break connection between the sensor and the monitoring means 34 in the device body 11. Prior devices required desoldering of contacts or cutting or disconnecting of wires to disconnect the sensor. The devices of the present invention require only that the sensor unit be slipped out of engagement with pin contact 23 and spring contact 24. No permanent connections need be disconnected.

In typical use, a preferred embodiment of a tool incorporating the detachable sensor unit, as shown in FIG. 1, is easily disassembled and reassembled. First, tip 26 is disengaged from barrel 44. Spring 17 or 29 then extends to its furthest position, thus exposing the end of sensor member 14 through the end of barrel 44. Sensor member 14 is then grasped and the sensor unit 10 is pulled out of receptacle housing 22 without the need for any additional tools to complete removal, although tools could be employed if the sensor unit is still warm. The sensor unit can then be serviced or exchanged. The tool is reassembled by simply reversing the disassembly steps described above.

From the foregoing it will be apparent to those skilled in the art that various modifications in the above-described devices can be made without departing from the scope and spirit of the invention. Accordingly, the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A heated iron comprising an operating element, a body and a detachable sensor unit:
   said operating element comprising:
      a barrel;
      a heating element mounted in association with said barrel; and
      a tip located at an end of said barrel in heat exchange relationship with said heating element, said tip having a hollow bore; said body comprising:
      a handle connected to the end of said barrel opposite said tip;
      means for monitoring the temperature of said operating element in relation to temperature measurements taken by said sensor unit; and
      first contacts mounted within said handle for connecting said sensor unit to said monitoring means; and
   said detachable sensor unit comprising:
      a unit housing;
      a temperature sensor mounted within said housing and positioned within said barrel and within said hollow bore of said tip to monitor the temperature of said tip; and
      second contacts on said housing for connecting said temperature sensor to said monitoring means, said second contacts being readily detachably connected to said first contacts.

2. The tool of claim 1 wherein said sensor unit further comprises:
   a spring mounted within said housing urging said temperature sensor into proximity with said tip.

3. The tool of claim 1 further comprising a spring mounted in said body, said sensor unit being situated within said barrel such that said spring biases said sensor unit toward said tip.

4. The tool of claim 6 wherein said tool additionally comprises a spring mounted within said handle biasing said sensor unit toward said tip such that said temperature sensor is urged into proximity with said tip.

5. A detachable sensor unit for use with a soldering or desoldering iron, the iron having a heatable tip connected to a heating element and also having a handle with a receptacle housing with receptacle inner and outer contacts, said sensor unit comprising:
   a) a hollow cylindrical sensor body with a first and a second end, with an opening formed in said first end;
   b) a bushing arranged for slidable movement within said body;
   c) a sensor member having a portion extending through said opening in said first end of said sensor body, said sensor member having a distal end and a proximate end, with said proximate end connected to said bushing;
   d) a temperature sensor carried on said distal end of said sensor member;
   e) a spring biasing said bushing and said sensor toward said first end of said body;
   f) sensor inner and outer contacts at said second end of said housing adapted for readily detachable engagement with the receptacle inner and outer contacts;
   g) leads connecting said sensor to said sensor unit inner and outer contacts; and
   h) said second end of said sensor body being configured for releasable engagement with the receptacle housing.

6. The detachable sensor unit of claim 5 wherein said second end of said sensor body forms a socket for receiving the receptacle inner contact, wherein the sensor inner contact is mounted within the socket for making electrical contact with the receptacle inner contact, and wherein said sensor outer contact is mounted near said second end of said sensor body for making electrical contact with the receptacle outer contact when said sensor unit is inserted into the receptacle housing.

7. The detachable sensor unit of claim 6 wherein said sensor inner contact and said sensor outer contact are separated by an insulator.

* * * * *